Oct. 7, 1958    H. KONET    2,854,763
NAVIGATION SYSTEM
Filed June 30, 1951
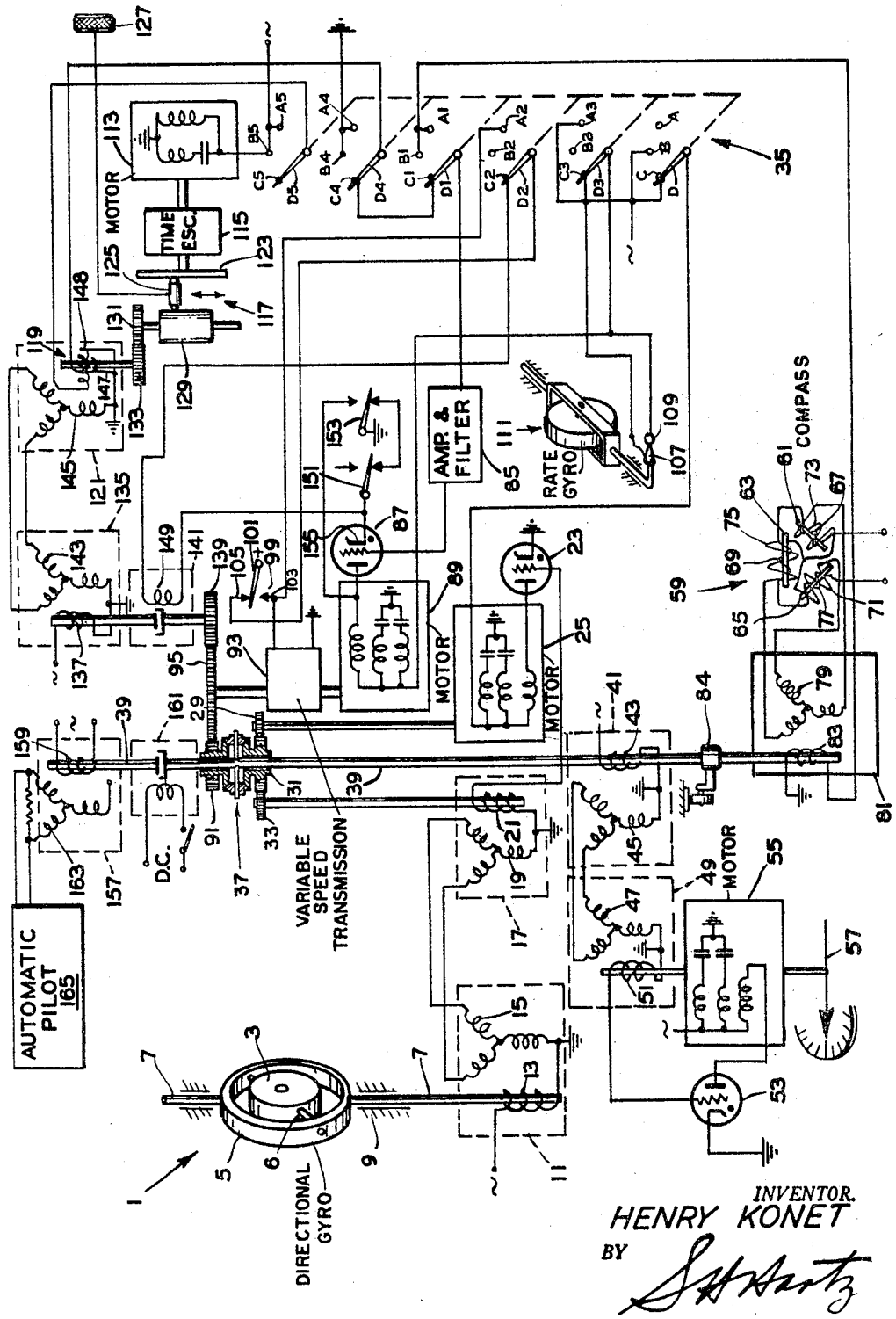
INVENTOR.
HENRY KONET
BY
S. H. Hartz
ATTORNEY United States Patent Office 2,854,763
Patented Oct. 7, 1958

2,854,763

NAVIGATION SYSTEM

Henry Konet, Hohokus, N. J., assignor to Bendix Aviation Corporation, Teterboro, N. J., a corporation of Delaware Application June 30, 1951, Serial No. 234,626

3 Claims. (Cl. 33—222)

The invention relates generally to navigation systems for mobile craft, and more particularly to a directional reference using a directional gyroscope.

As is well known in the art, directional gyroscopes precess in response to bearing friction, the earth's rotation and other causes and provide an erroneous direction reference, which unless corrected effectively destroys the utility of the gyroscope as a directional reference.

It has been proposed to slave the gyroscope by a magnetic compass and precess the gyroscope to a fixed reference by imposing corrective precession forces on the gyroscope as it departs from the required reference.

However, this arrangement is not practical where the magnetic compass is not reliable, such as near the magnetic poles, where the earth's magnetic field is unsuitable for navigation. With the improved air travel we have today, it is necessary that the directional reference function accurately near the magnetic poles so that the craft can fly directly to its destination.

One object of the present invention is to provide a novel directional reference, including a directional gyroscope, compensated for errors caused by the earth's rotation and for random drift of the gyroscope.

Another object is to provide a novel directional reference adapted particularly for use on aircraft and which may function selectively as a magnetic compass, as a directional gyroscope corrected by a magnetic compass, or as a directional gyroscope with compensation for errors caused by the earth's rotation, and other causes.

Another object is to provide a novel directional reference using a directional gyroscope in which the requirement for corrective precession of the gyroscope is avoided.

Another object is to provide a novel navigation system for mobile craft which may be used to indicate direction and/or to maintain the craft on a predetermined heading.

Another object is to provide a directional reference including a directional gyroscope and means for correcting the directional reference for errors of the gyroscope without imposing a corrective precession torque on the gyroscope.

Another object is to provide a novel directional reference for mobile craft including a magnetic compass and a constant rate compensating arrangement operable selectively to correct the directional reference for errors of the gyroscope.

Another object is to provide a novel directional reference for aircraft which supplies all the directional data necessary for navigation and control purposes.

The invention contemplates a directional reference including a directional free gyroscope and a reference device controlled thereby and means for correcting the reference device for errors of the gyroscope. The means may comprise a compass responsive to the earth's magnetic field or means for correcting the reference device at a constant rate as a function of the earth's rotation and other errors of the gyroscope. The compass or the correcting means may be selected at the will of the operator for correcting the reference device, or the magnetic compass may be used without the directional gyro to control the reference device.

The foregoing and other objects and advantages of the invention will appear more fully hereinafter from a consideration of the detailed description which follows taken together with the accompanying drawing, wherein one embodiment of the invention is illustrated. It is to be expressly understood, however, that the drawing is for the purposes of illustration and description only and is not to be construed as defining the limits of the invention.

The single figure of the drawing is a diagram showing schematically the relative arrangement of the mechanical and electrical elements comprising the novel directional reference of the present invention.

Referring now to the drawing for a more detailed description of the directional reference of the present invention, the directional reference includes a directional gyroscope 1 having a rotor (not shown) rotatable about a horizontal spin axis in a support 3. Support 3 is mounted in a gimbal 5 by trunnions 6 for tilting movement about a horizontal axis perpendicular to the spin axis. Gimbal 5 is mounted for angular movement about a vertical axis by trunnions 7 within a suitable instrument housing 9 rigidly mounted on the craft. Suitable erecting means (not shown) maintain the rotor spin axis in a substantially horizontal plane.

A transmitter inductive device 11 has a three phase stator winding 15 fixed to housing 9 and a single phase rotor winding 13 energized by an alternating current source and fixed to trunnion 7. A receiver inductive device 17 has a three phase stator winding 19 connected to stator winding 15 of inductive device 11 and a single phase rotor winding 21 connected to a thyratron amplifier 23 to control operation of a motor 25 in response to the error signal between transmitter inductive device 11 and receiver inductive device 17.

Thyratron amplifier 23 and motor 25 may be of the kind shown and described in copending application, Serial No. 220,034, filed April 9, 1951, by Henry Konet and Charles E. Hurlburt, now Patent No. 2,745,288, issued May 15, 1956, and assigned to the same assignee as the present application. When the error signal between inductive devices 11 and 17 is of one phase, thyratron 23 conducts and drives motor 25 in one direction; and when the error signal is of opposite phase, thyratron 23 is non-conductive and motor 25 is driven in the opposite direction by the alternating power source.

A three position gang switch 35 has a movable contact D and an open fixed contact A and parallel connected fixed contacts B, C, connecting the field windings of motor 25 to an alternating power source. When movable contact D of switch 35 engages contact A, motor 25 is de-energized; and when movable contact D engages either contact B or contact C, motor 25 responds to the error signal between transmitter inductive device 11 and receiver inductive device 17.

Motor 25 drives rotor 21 of inductive device 17 through gears 29, 31, and 33, until rotor 21 is at null relative to rotor 13 of inductive device 11. Gear 31 comprises one input to a differential 37 having its output drivably connected to a rotatable shaft 39.

A transmitter inductive device 41 has a single phase rotor winding 43 energized by an alternating current source and driven by shaft 39. Device 41 has also a three phase stator winding 45 connected to a three phase stator winding 47 of a receiver inductive device 49. Receiver inductive device 49 has a single phase rotor winding 51 connected to a thyratron amplifier 53 which controls operation of a motor 55. Motor 55 is drivably connected to the rotor 51 of inductive device 49 and to a pointer 57 for indicating direction. Amplifier 53 and motor 55 may be of the kind shown and described in the above mentioned copending application. The system thus far described provides a direction indication responsive to the directional gyroscope.

In regions where the earth's magnetic field is suitable for navigation, an earth-inductor compass 59 responsive to the earth's magnetic field is used to correct the directional reading of pointer 57 due to errors of the gyroscope caused by rotation of the earth and other causes. Earth-inductor compass 59 comprises three cores 61, 63, 65, arranged in triangular relation and mounting series connected windings 67, 69, and 71, respectively, energized by a pulsating current. Secondary windings 73, 75, 77, also are wound on cores 61, 63, 65, respectively, and are connected to the three phase stator winding 79 of a receiver inductive device 81. Inductive device 81 has a single phase rotor winding 83 rotatable by shaft 39. A conventional cam corrector mechanism 84 is provided in shaft 39 to compensate for any magnetic deviation affecting compass 59.

Signals corresponding to the angular disposition of the cores relative to the earth's magnetic field are developed within each of the secondary windings 73, 75, 77, and are communicated to stator winding 79 of inductive device 81. The error signal induced in rotor 83 of inductive device 81 is applied through fixed contacts A', B', and movable contact D' of selector switch 35 to a conventional voltage amplifier and filter circuit 85. The amplified and filtered signal is applied to a thyratron control circuit 87 for controlling a motor 89 drivably connected to the second input 91 of differential 37 through a variable speed mechanism 93 and a gear 95. Thyratron control circuit 87 and motor 89 may be of the kind shown and described in the above mentioned copending application.

When an error signal occurs between the position of rotor 83 of inductive device 81 and the output of earth inductive compass 59, motor 89 will drive shaft 39 until rotor winding 83 of inductive device 81 is at null. Rotation of shaft 39 moves rotor winding 43 of inductive device 41 and provides an error signal between rotor winding 43 of inductive device 41 and rotor winding 51 of inductive device 49 to operate motor 55 until rotor winding 51 is driven to null. This provides a corrected direction reading on pointer 57, and it will be observed that the correction is made without precessing gyroscope 1.

Variable speed mechanism 93 is normally in low speed position; that is, the drive between motor 89 and input 91 of differential 37 is a low gear ratio. Variable speed mechanism 93 provides a high speed ratio between motor 89 and input 91 of differential 37 when it is energized by operating a synchronizer switch 99 or by moving selector switch 35 so that movable contact $D^2$ engages fixed contact $A^2$.

Synchronizer switch 99 has a movable contact 101 connected to a D. C. power source and a fixed contact 103 connected to variable speed mechanism 93 and to fixed contact $A^2$ of selector switch 35. Fixed contact 105 of synchronizer switch 99 is connected to movable contact $D^2$. Variable speed mechanism 93 is energized when movable contact 101 of synchronizer switch 99 engages fixed contact 103 or when movable contact $D^2$ of selector switch 35 engages fixed contact $A^2$. Switch 99 is biased so that movable contact 101 engages fixed contact 105 as shown in the drawing.

Motor 89 is energized by an alternating current source when movable contact $D^3$ of selector switch 35 engages either fixed contact $C^3$ or $A^3$ and, alternatively, when movable contact $D^3$ engages fixed contact $B^3$, motor 89 is energized from the alternating power source through normally closed contacts 107, 109 controlled by an angular rate gyroscope 111 having its spin axis extending transversely of the craft. This arrangement interrupts the compass correction while the craft turns when movable contact $D^3$ of selector switch 35 engages fixed contact $B^3$.

In some instances it may be desirable to dispense with correcting the pointer by the earth inductor compass, particularly in regions, such as at the earth's poles, where the earth's magnetic field is unreliable for navigation. Means is provided for correcting the directional reading of the pointer at a substantially constant rate corresponding to the errors of the gyroscope.

A constant speed motor 113 drives a time escapement 115 drivingly connected through a variable speed device 117 to a rotor 119 of an inductive device 121. Rotor 119 is rotated at a constant speed which may be varied by variable speed mechanism 117 according to the latitude in which the craft is flying. Variable speed mechanism 117 comprises a disk 123 driven by time escapement 115 and a ball carriage 125 movable radially relative thereto by a knob 127. The position of ball carriage 125 along a radius of disk 123 determines the speed and direction of rotation of a cylinder 129. Cylinder 129 is drivably connected to rotor 119 of inductive device 129 through gears 131, 133. Rotor 119 of inductive device 121 has two phase windings 147, 148, connected to movable contacts $D^4$ and $D^5$ of selector switch 35.

An inductive device 135 has a single phase rotor winding 137 energized by an alternating current source and driven by gear 95 through gear 139 and an electromagnetic clutch 141. Inductive device 135 has a three circuit stator winding 143 connected to a three circuit stator winding 145 of inductive device 121.

When rotor winding 137 of inductive device 135 and rotor winding 147 of inductive device 119 are not in synchronism with one another, an error signal develops. When movable contacts $D^4$ and $D^1$ of selector switch 35 engage fixed contacts $C^4$ and $C^1$, when the error signal from inductive devices 119 and 135 is applied to amplifier 85 and the error signal controls motor 89 drivably connected to one input 91 of differential 37. This provides for correcting the reading of pointer 57 due to errors of directional gyroscope 1.

When movable contact $D^4$ of selector switch 35 engages contact $A^4$ or $B^4$, both ends of rotor winding 147 are grounded, and the error signal is no longer applied to amplifier 85. Also, when movable contact $D^5$ of selector switch 35 engages fixed contact $A^5$ or $B^5$, rotor winding 148 is connected to an alternating current source and is energized thereby. In addition, when movable contact $D^2$ of selector switch 35 engages fixed contact $A^2$ or $B^2$, solenoid 149 of clutch 141 is deenergized and disconnects inductive device 135 from driven gear 139. Under these circumstances, since rotor winding 137 of inductive device 135 and rotor winding 148 of inductive device 121 are both energized, rotor winding 137 will rotate to a null position relative to rotor winding 148 so that both rotor windings are constantly synchronized for immediate connection in the system.

Selector switch 35 provides for operating the system (1) as a magnetic compass, (2) as a directional gyroscope corrected by a magnetic compass, or (3) as a directional gyroscope with compensation for errors caused by the earth's rotation and other causes. When the system is to be operated as a magnetic compass, movable contacts D, $D^1$, $D^2$, $D^3$, $D^4$ and $D^5$, are moved into engagement with fixed contacts A, $A^1$, $A^2$, $A^3$, $A^4$ and $A^5$, respectively.

With the selector switch 35 in the position described, motor 25, responsive to signals from the directional gyroscope, is de-energized, because contact A is unconnected and locks the input 31 of differential 37. Motor 89 is energized through contacts $D^3$, $A^3$, and signals from the earth inductor compass 59 are applied through contacts D¹, A¹ to amplifiers 85 and 87 to control motor 89. Solenoid 97 of variable speed mechanism 93 is energized through contacts D², A², so that motor 89 drives input 91 of differential 37 through the high speed gears. Also, movable contact D² when engaging fixed contact A² is disengaged from contact C² leaving de-energized solenoid 149 of electromagnetic clutch 141 and disengages rotor winding 137 of inductive device 135 from driving connection with motor 89. Winding 147 of rotor 119 is grounded through contacts D⁴, A⁴, to render the winding ineffective, and winding 148 of rotor 119 is energized so that rotor winding 137 of inductive device 135 moves to and is maintained in angular correspondence with rotor winding 148 of inductive device 121.

When selector switch 35 is in the position described, pointer 57 is controlled solely by earth inductor compass 59.

The system may function as a direction gyroscope corrected by a magnetic compass by moving movable contacts D, D¹, D², D³, D⁴, and D⁵, into engagement with fixed contacts B, B¹, B², B³, B⁴, and B⁵, respectively. Since contacts A' and B', contacts A⁴ and B⁴, and contacts A⁵ and B⁵ are connected together, they function in the same manner as described above. With selector switch 35 in the position described, motor 25 is energized through contacts D, B, and responds to the output of directional gyroscope 1. Variable speed mechanism 93 is de-energized so that motor 89 drives input 91 of differential 37 through the low speed gear train of variable speed mechanism 93.

The blank at contact B³ provides for energizing motor 89 only through contacts 107, 109 controlled by angular rate gyroscpoe 111 so that motor 89 is de-energized and rendered ineffective during turning of the craft. Motor 25, responsive to the directional gyroscope, and motor 89, responsive to the compass, cooperate to position pointer 57.

The system functions as a directional gyroscope with compensation for errors of the gyroscope in response to the earth's rotation, and other causes by moving movable contacts D, D¹, D², D³, D⁴, and D⁵, into engagement with fixed contacts C, C¹, C², C³, C⁴, and C⁵, respectively.

With the selector switch 35 in this position, motor 25 remains energized through contacts D, C, and responds to relative movement of gyroscope 1 and the craft. Motor 89 is energized through contacts D³, C³. Rotor winding 148 of inductive device 121 is disconnected from the alternating power source by contacts D⁵, C⁵, and the output of rotor winding 147 of inductive device 121 is connected through contacts D⁴, C⁴, and D¹, C¹, to amplifiers 85 and 87 to control motor 89. Also, solenoid 149 of clutch 141 is energized by contacts D², C², so that rotor winding 137 is drivably connected to motor 89 and to input 91 of differential 37. With the switch in the position described, pointer 57 is responsive to the directional gyroscope and to the signal provided by inductive device 121 rotated at constant speed by motor 113 as set in accordance with a function of latitude.

When the system is used as a directional gyroscope with the compensation described, pointer 57 may not be indicating the correct direction, and the pointer is initially corrected manually by operating switch 151 or 153 which are biased to the positions shown in the drawing. Moving switch 151 from its biased position disconnects cathode 155 of thyratron 87 from ground, and motor 89 is energized from the power source and drives rotor 43 of inductive device 41 in one direction and pointer 57 moves in one direction in response thereto. Moving switch 153 from its biased position shorts out thyratron 87 and grounds the field windings of motor 89 so that the motor drives rotor 43 of inductive device 41 in the opposite direction, and pointer 57 moves in the opposite direction in response thereto. Moving switch 151 or 153 from the biased position de-energizes solenoid 149 of clutch 141 so that rotor 137 of inductive device 135 is disengaged from motor 89 and remains at rest. After the pointer is initially adjusted, it will accurately indicate direction compensated for drift errors of the gyroscope.

While adjusting the pointer in the manner described, motor 89 will drive the input 91 of differential 37 through the low speed gears of variable speed mechanism 93 unless synchronizing switch 99 is moved from its biased position, whereupon variable speed mechanism 93 is energized and motor 89 drives the input 91 of differential 37 through the high speed gears.

After the system is operating as a directional gyroscope compensated for errors of the gyroscope and the system is adjusted to operate as a directional gyroscope corrected by the magnetic compass, if the indication of pointer 57 does not correspond to the compass heading, then the pointer may be moved rapidly to the corrected indication by moving synchronizing switch 99 from its biased position to connect motor 89 to the input of differential 37 through the high speed gears of variable speed mechanism 93.

The system described, in addition to indicating the direction, may be used also for controlling the course of the craft by providing a signal generator 157 having a single phase rotor winding 159 energized by an alternating current source and drivably connected to shaft 39 through an electromagnetic clutch 161. Inductive device 157 also includes a stator winding 163, and a signal is induced therein as determined by the angular position of rotor winding 159 relative thereto. The signal may be applied to an automatic pilot 165 of any suitable kind for operating the control surfaces of the craft to control its course.

The system described may function selectively as a magnetic compass, as a directional gyroscope corrected by a magnetic compass or as a directional gyroscope with compensation for errors of the gyroscope in response to the earth's rotation, bearing friction, and other causes. The system indicates direction and/or maintains a craft on a predetermined heading and supplies all the directional data necessary for navigation and control purposes.

When the system functions as a directional gyroscope corrected by a magnetic compass or compensated for errors of the gyroscope, the reference device is corrected without imposing corrective precession torques on the gyroscope.

Although but one embodiment of the invention has been illustrated and described in detail, it is to be expressly understood that the invention is not limited thereto. Various changes can be made in the design or arrangement of the parts without departing from the spirit and scope of the invention as the same will now be understood by those skilled in the art.

What is claimed is:

1. A directional reference for mobile craft comprising a reference device, differential means having an output operatively connected to said reference device and having two inputs, a directional gyroscope subject to errors in response to the earth's rotation and operatively connected to one input of said differential, a compass responsive to the earth's magnetic field and adapted to provide signals corresponding thereto, means adapted to provide a substantially constant signal, and means for selectively controlling the other input of said differential by one of said signals and for selectively rendering said directional gyroscope ineffective when said compass signal is controlling said other input, so that the reference device may be controlled by the magnetic compass alone or by the directional gyroscope corrected by the magnetic compass or by the directional gyroscope corrected by the constant signal means.

2. A directional reference for mobile craft comprising a reference device, differential means having an output operatively connected to said reference device and having two inputs, a servomotor driving each of said inputs, a directional gyroscope subject to errors caused by the earth's rotation and controlling one of said servomotors, the other of said servomotors correcting said reference device for said errors, a compass responsive to the earth's magnetic field adapted for driving said other servo motor, means adapted for driving said last-mentioned servomotor at a substantially constant rate, and means for selectively controlling said last-mentioned servomotor by said constant driving means and by said compass, said constant driving means comprising a driving motor, a first signal developing device driven by said driving motor, a second signal developing device connected electrically to said first signal developing device and drivably connected to said last-mentioned servomotor, means for disconnecting said second device from driving connection with said last-mentioned servomotor when said compass controls said last-mentioned servomotor, and means for synchronizing rotation of said signal developing devices when said second signal developing device is disconnected from driving relation with said last-mentioned servomotor.

3. A directional reference for mobile craft comprising a reference device, differential means having an output operatively connected to said reference device and having two inputs, a servomotor driving each of said inputs, a directional gyroscope subject to errors caused by the earth's rotation and controlling one of said servomotors, a compass responsive to the earth's magnetic field for driving said other servomotor to correct the reference device for errors of the gyroscope, means adapted to drive said last-mentioned servomotor at a substantially constant rate to correct said reference device for errors of the gyroscope, and means for selectively controlling said last-mentioned servomotor by said constant driving means or by said compass, said constant driving means comprising a driving motor, a first signal developing device driven by said driving motor, a second signal developing device connected electrically to said first signal developing device and drivably connected to said last-mentioned servomotor, means for disconnecting said second device from driving connection with said last-mentioned servomotor when said compass controls said last-mentioned servomotor, and means for synchronizing rotation of said signal developing devices when said second signal developing device is disconnected from driving relation with said last-mentioned servomotor.

References Cited in the file of this patent
UNITED STATES PATENTS

| | | |
|---|---|---|
| 2,208,207 | Boykow | July 16, 1940 |
| 2,555,328 | Esval et al. | June 5, 1951 |
| 2,611,190 | MacCallum et al. | Sept. 23, 1952 |
| 2,614,335 | Noxon | Oct. 21, 1952 |
| 2,699,612 | Kellogg | Jan. 18, 1955 |

FOREIGN PATENTS

| | | |
|---|---|---|
| 49,251 | France | Nov. 12, 1938 |
| | (1st addition to No. 793,301) | |